(12) United States Patent
Perelman et al.

(10) Patent No.: US 10,968,937 B2
(45) Date of Patent: Apr. 6, 2021

(54) MULTIFUNCTIONAL MOUNTING BRACKET (71) Applicant: SISO A/S, Skovlunde (DK)

(72) Inventors: David Tomas Perelman, Skovlunde (DK); Amir El Safty, Skovlunde (DK)

(73) Assignee: SISO A/S, Skovlunde (DK)

( * ) Notice: Subject to any disclaimer, the term of this patent is extended or adjusted under 35 U.S.C. 154(b) by 0 days.

(21) Appl. No.: 16/454,984

(22) Filed: Jun. 27, 2019

(65) Prior Publication Data
US 2020/0003243 A1 Jan. 2, 2020

(30) Foreign Application Priority Data

Jun. 8, 2018 (DK) .................................. 2018 00304

(51) Int. Cl.
| | | |
|---|---|---|
| *F16B 12/44* | (2006.01) | |
| *A47B 3/00* | (2006.01) | |
| *A47B 9/18* | (2006.01) | |
| *A47B 13/00* | (2006.01) | |
| *A47B 9/00* | (2006.01) | |

(52) U.S. Cl.
CPC .............. *F16B 12/44* (2013.01); *A47B 3/002* (2013.01); *A47B 9/18* (2013.01); *A47B 13/003* (2013.01); *A47B 2009/006* (2013.01); *F16B 2012/446* (2013.01)

(58) Field of Classification Search
CPC .... F16B 12/44; F16B 2012/446; A47B 3/002; A47B 9/18; A47B 13/003; A47B 2009/006; A47B 2200/0039; A47B 91/02
USPC ................................. 248/222.52, 296.1, 188
See application file for complete search history.

(56) References Cited

U.S. PATENT DOCUMENTS

| | | | |
|---|---|---|---|
| 3,783,799 A | 1/1974 | Dupuis | |
| 4,303,018 A | 12/1981 | Lehmann | |
| 5,624,200 A * | 4/1997 | Beaulieu | A47B 47/0033 248/222.52 |
| 6,629,506 B2 * | 10/2003 | Park | F16B 9/052 108/156 |
| 7,984,679 B1 | 7/2011 | Alexander | |
| 2014/0167404 A1 * | 6/2014 | Wilson | F16L 41/03 285/61 |
| 2015/0245705 A1 * | 9/2015 | Gouttenoire | A47B 13/003 248/188 |
| 2016/0003276 A1 * | 1/2016 | Moller Hansen | A47B 13/003 403/116 |

(Continued)

FOREIGN PATENT DOCUMENTS

| | | |
|---|---|---|
| EP | 0 431 016 B1 | 9/1993 |
| EP | 1 050 239 A1 | 11/2000 |

(Continued)

OTHER PUBLICATIONS

Search Report from Denmark Application No. PA 2018 00304, dated Dec. 12, 2018.

*Primary Examiner* — Muhammad Ijaz
(74) *Attorney, Agent, or Firm* — Merchant & Gould P.C.

(57) ABSTRACT

A simple and versatile mounting bracket for mounting e.g. legs on a piece of furniture is provided. The multifunctional mounting bracket facilitates a switch between two states, e.g. a switch between using a table as a dining table and using the table as a coffee table, or a switch between a "table" position and a "stack-up" position without the use of tools.

17 Claims, 12 Drawing Sheets

(56) References Cited

U.S. PATENT DOCUMENTS

2018/0209460 A1* 7/2018 Lin .................... F16B 12/40
2020/0003243 A1* 1/2020 Perelman ............ A47B 3/002
2020/0229593 A1* 7/2020 Kumar ............... A47B 13/003

FOREIGN PATENT DOCUMENTS

EP        2 701 550 B1   10/2016
GB          2498200 A     7/2013

* cited by examiner

MULTIFUNCTIONAL MOUNTING BRACKET

This application is a claims benefit of Serial No. PA 2018 00304, filed Jun. 28, 2018 in Denmark, the application of which is incorporated herein by reference. To the extent appropriate, a claim of priority is made to the above disclosed application.

TECHNICAL FIELD

The present invention relates to a multifunctional mounting bracket for a furniture leg element. The furniture could e.g. be a table.

BACKGROUND OF THE INVENTION

The present invention provides a simple and versatile mounting bracket which facilitates a dual mode furniture and which can be used by both amateur and professional craftspeople. The brackets e.g. provide a table with the functionality that it in one mode may function as a dining table having the table top at a relatively high level, and in an alternative mode may function as a coffee table having the table top at a relatively low level. In addition, the brackets of the invention may easily be adapted to facilitate a switch between e.g. a table mode and a stack-up mode. Importantly, the brackets do not require any specialized tools for mounting on the furniture.

U.S. Pat. No. 4,303,018 discloses a convertible table which is moveable from a high position to a low position and vice-versa. The mechanism is an integrated part of the table construction, it appears rather complex, and it seems to be applicable only to round tables. The mechanism is not suitable to be mounted by amateurs.

Another example of a table with adjustable height can be found in EP 0 431 016. Also in EP 0 431 016 the mechanism providing the dual-mode functionality is relatively complex and is not adaptable to provide a stack-up mode.

Tables which can be switched between a table mode and a mode facilitating storage are known. EP 2 701 550 is one such example. While EP 2 701 550 provides a convenient mechanism for the switching between the table- and the storage modes, it depends on specially manufactured table tops and legs.

Thus there is a demand for a versatile multifunctional mounting bracket which in a simple and durable way allows standard, ready-made furniture legs to be mounted on to standard table-top plates by both amateur and professional craftspeople without the use of anything but standard tools, such as a screwdriver and perhaps a drill.

SUMMARY OF THE INVENTION

The general object of the present invention is to provide a simple and versatile mounting bracket for mounting e.g. legs on a piece of furniture. The multifunctional mounting bracket facilitates a switch between two states, e.g. a switch between the use as a dining table and as a coffee table, or a switch between a "table" position and a "stack-up" position without the use of tools.

It is a further object of the invention that the bracket is simple to mount without the use of any specialized tools.

The above object and advantages, together with numerous other objects and advantages, which will be evident from the description of the present invention, are according to one aspect of the present invention obtained by:

A multifunctional mounting bracket for connecting at least one furniture leg to a mounting surface of a furniture, such as a table top, the multifunctional mounting bracket comprising a top element, and a bottom element rotationally connected to each other, the top element comprising two connection surfaces defining first and second planes, respectively, and each having connection means for connecting e.g. a furniture leg at each of the connection surfaces, the top element further comprising a top element interface surface defining a third plane, the first and second planes of the two connection surfaces, respectively, being arranged at a first angle being different from zero in relation to each other, and at second and third angles different from zero in relation to said third plane of said top element interface surface, the bottom element comprising a mounting surface defining a fourth plane and arranged for connection to the mounting surface of the furniture, the bottom element further comprising a bottom element interface surface rotationally connected to the top element interface surface and defining a plane fifth plane, being arranged parallel to the third plane and arranged at a fourth angle different from zero in relation to the mounting surface.

The two mounting surfaces of the top element of the bracket may in principle have any design. To obtain satisfactory results, the two mounting surfaces of the top element are preferably designed to fit in size and form to the cross section of the legs intended to be mounted on the furniture.

The mounting bracket may in principle be made of any suitable material. The multifunctional mounting bracket is for the major part preferably made of a material that is suitable for casting or molding, such as various polymers or metals. Preferred materials are plastics, such as Polycarbonate (PC) or Acrylonitrile butadiene styrene (ABS). The projecting threaded rod and/or the inner threaded element is typically made of metal or metal alloys, such as steel, stainless steel, bronze or brass.

According to a further embodiment of the invention, the first angle is approximately numerically twice as large as the fourth angle.

According to a further embodiment of the invention, the sum of the second and the fourth or the third and the fourth angle is numerically approximately 90 degrees. Typically, the second and the third angle are approximately similar. By designing a bracket wherein said sum is 90° and wherein the first angle is approximately twice the fourth angle, one obtains that each leg may be in a first position in which the leg is parallel with the underside of a the table top, and in a second position where the leg is resting on a floor surface.

According to a further embodiment of the invention, the second and the third angle, respectively, is numerically between approximately 40-90 degrees, preferably between approximately 45-70 degrees, such as approximately 45 degrees.

In one preferred embodiment, the first angle is approximately 90 degrees and the second, third, and fourth angles are approximately 45 degrees. This allows the two legs of each mounting bracket to be rotated from a position parallel with a table top and to a position resting on a floor surface and being approximately vertical.

In an alternative embodiment, the first angle is less than 90 degrees, the second and the third angles are over 45 degrees, and the fourth angle is less than 45 degrees. This alternative embodiment allows the two legs of each mounting bracket to be rotated from a position parallel with a table top and to a position resting on a floor surface at an inclined angle.

According to a further embodiment of the invention, the multifunctional mounting bracket comprises a locking mechanism arranged within a cavity of the mounting bracket for locking the mounting bracket into one of two positions, corresponding to a rotation of the top element in relation to the bottom element of approximately 180 degrees.

By arranging the multifunctional mounting bracket with a locking mechanism, it is possible to avoid that the bracket, when being mounted to the underside of a table top and arranged with two table legs, unintentionally rotates, which could cause the table to collapse. In an alternative embodiment, the top element interface surface and bottom element interface surface may comprise friction means enabling the mounting bracket from being unintentionally rotated. The friction means is arranged such that a certain rotational force is required.

According to a further embodiment of the invention, the locking mechanism comprises an activating push button for releasing the locking mechanism.

Upon activation, the push bottom unlocks the bracket and allows the top and bottom elements to be rotated approximately 180 degrees. The activating push bottom may in a further embodiment be spring-loaded.

According to a further embodiment of the invention, the locking mechanism comprises a locking plate having at least one interlocking connector, the interlocking connector being arranged for interlocking the top element and the bottom element in relation to each other against rotational movement.

However, the locking mechanism may comprise any element suitable for locking the top element and the bottom element in relation to each other.

According to a further embodiment of the invention, the connection surface comprises a number of protrusions or elevations, e.g. in the form of ribs, for creating a frictional engagement with e.g. a furniture leg being connected to the connection surfaces.

Such protrusions or elevations have been found to provide a particularly sturdy assembly of a leg to the connection surface.

According to a further embodiment of the invention, the top element interface surface and said bottom element interface surface are substantially circular or quadratic.

Ready-made furniture legs in many different designs are available. Usually, legs have a circular or quadratic cross section, but legs with other cross sections, e.g. oval or rectangular, are possible to obtain. Naturally, in the situation where furniture legs with a circular cross section are to be mounted on the furniture, mounting surfaces which are substantially circular are preferred, whereas in the situation where legs having a quadratic cross section are to be attached to the bracket, an embodiment where the mounting surfaces are substantially quadratic is preferred.

According to a further embodiment of the invention, the connection means comprises a projecting threaded rod suitable for connection to an internal thread element of a furniture leg, or an internal thread element suitable for engaging a projecting threaded rod of a furniture leg. The projecting threaded rod or the internal thread may be spring-loaded by a spring element, providing a tensional force against rotation of the projecting bolt or the internal thread.

In case the internal thread or the projecting threaded rod elements are spring-loaded, the springs are designed to exert a tensional force on the internal thread elements of a size enabling furniture legs to be attached to the multifunctional mounting bracket in a rigid fashion throughout a considerable and continuous angle of rotational adjustment without subjecting the furniture leg to forces which overload the leg material.

The possibility of a non-destructive rotational adjustment is particularly important if the furniture leg has a non-circular cross section.

While the present invention is intended to be used in all situations where a furniture leg is to be attached to a piece of furniture, it is believed that the present invention may in particularly appeal to the amateur craftsman.

In contrast to professional furniture makers, the amateur may find him- or herself to be in a onetime situation when mounting furniture legs on a furniture. Accordingly, the amateur may well be without the stock of suitable fastenings means that professional craftsmen naturally build over time. Therefore, the amateur craftsman will in particular find it useful to obtain the invention in the form of a kit of parts comprising at least one multifunctional mounting bracket, suitable fastening means, and instructions of use.

The kit may also comprise suitable furniture legs.

In one embodiment, the kit of parts comprises a suitable bumper, which may be mounted on one connection surface of the multifunctional mounting bracket. In this case, the other connection surface of the bracket may be mounted with a suitable furniture leg to provide an assemblage facilitating an easy shift between a table position and a stack-up or storage position.

The bumper may be designed with a surface with a relatively high friction, e.g. rubber, and with a central fastening means that fits with the fastening means on the top element surfaces.

It should be understood that the multifunctional mounting bracket is not limited to the mounting of legs (or legs and bumpers) on a piece of furniture, e.g. a table, a desk, a shelf, a cabinet or the like, but may as well be applied to any suitable device that is desired to be able to be set into two positions.

DETAILED DESCRIPTION

A further understanding of the nature and advantages of the present invention may be realized by reference to the remaining portions of the specification and the accompanying drawings. In the following, preferred embodiments of the invention are explained in more detail with reference to the drawings, wherein:

FIGS. 11A and 11B illustrate the shift between the table- and the stack-up position of tables mounted with four mounting brackets, each of which is equipped with a table leg and a rubber bumper.

FIG. 11A shows a table with brackets in a table position.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will thus not be described in detail with respect to the description of each figure.

Figure 1:
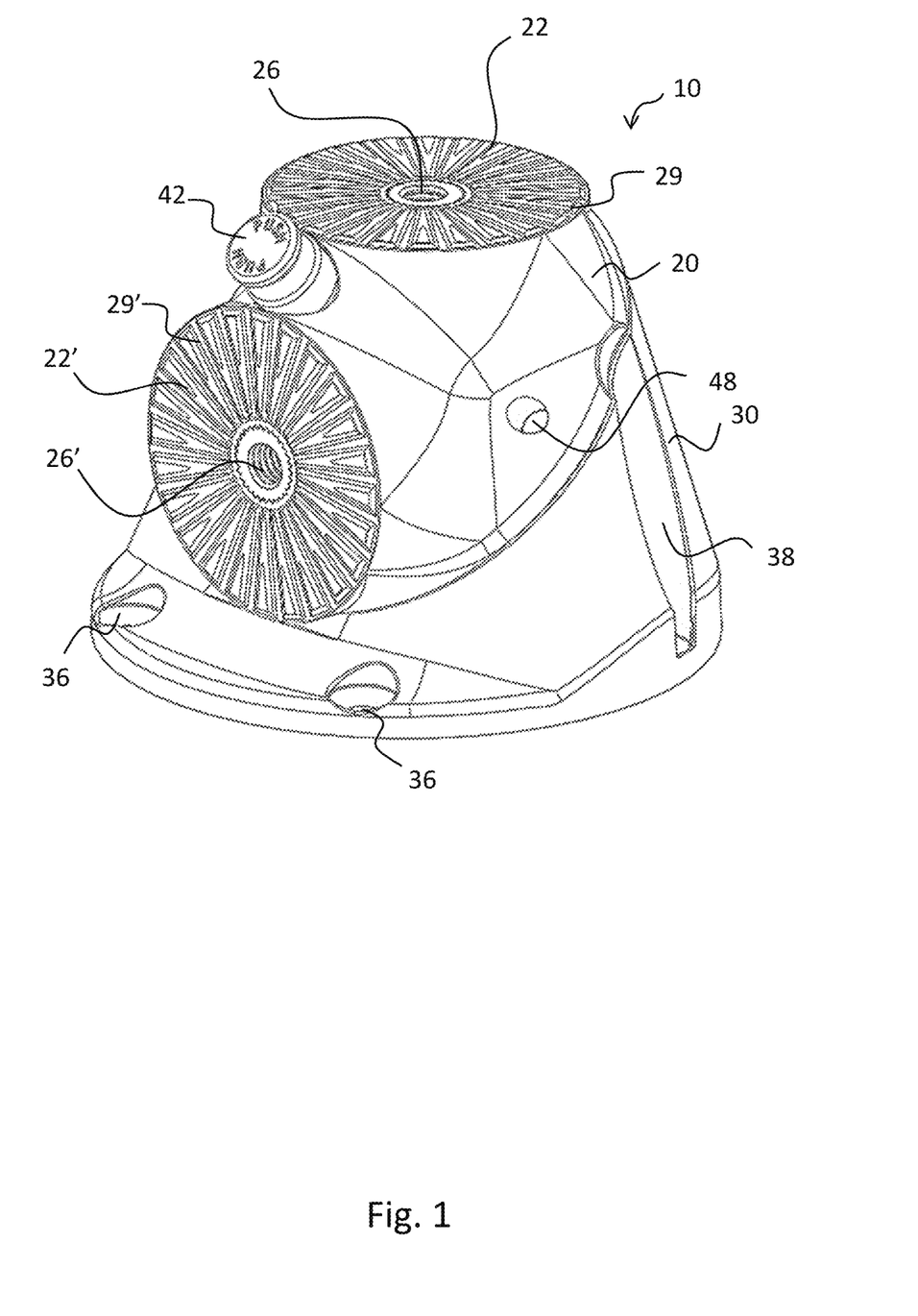
FIG. 1 shows a perspective view of the multifunctional mounting bracket.

FIG. 1 is a perspective view of one embodiment of the multifunctional mounting bracket adapted to be equipped with legs having a circular cross section. Accordingly, the two connection surfaces (22, 22') are circular. The multifunctional mounting bracket may be adapted to be equipped with legs having a cross section which is not circular. In principle, the cross section of the legs may be of any design, e.g. quadratic or oval. Also, combinations, e.g. a bracket equipped with a long round leg and a short quadratic leg, or vice versa, is envisioned.

To achieve a good result, it is preferred that the connection (or abutment) surface of the furniture leg and of the top surface of the bracket is of a size which is essentially similar.

The two leg connection surfaces (22, 22') on the top element of the bracket 10 are arranged at an angle which in one embodiment is approximately 90° relative to each other. In the centre of the connection surfaces (22, 22') of this embodiment are connecting means which are in the form of inner threads 26 and 26'. The inner threads are designed to fit with a central elongated threaded element of a relevant furniture leg.

The inner threads may be fixed inner threads, or they may be spring-loaded inner thread elements. A spring-loaded inner thread element has the essential function to make the furniture leg continuously, circumferentially adjustable over a large arc while maintaining a tight attachment of the leg. Thereby, it is possible to tighten and adjust the leg without overloading the leg. Thus, material fracture is avoided. This is particularly important if the furniture leg has a cross section which is not circular, and accordingly need to be adjusted to align the sides of the leg to the form of the connection surfaces (22, 22'). The connection surfaces on the top element 20 may contain a number of protrusions or elevations, e.g. in the form of ribs 29. Such structures add to a stable attachment of the furniture legs to the top element of the bracket 20.

Further to the top element 20, the mounting bracket 10 comprises a bottom element 30.

The two elements 20 and 30 are mutually rotatable.

In the embodiment on FIG. 1, the axis of rotation is inclined approximately by 45° relative to the mounting surface of the furniture. By rotating the top element 180° relatively to the bottom element, a first connection surface 22 is moved from a horizontal position to a vertical position—see below. The interface between the top element 20 and the bottom element 30 forms a plane which in this embodiment is at an angle of approximately 45° relative to the mounting surface of the furniture.

Integrated in the mounting bracket is a locking mechanism which may be released e.g. by actuating the push button 42.

Typically, the multifunctional mounting bracket can be mounted on the surface of the furniture simply by using appropriate fastening means, e.g. screws. It is a particular advantage of the present invention that no milling or machining of the furniture surface is required to fit the multifunctional mounting bracket onto the furniture surface. This feature is especially appreciated by amateur craftsmen.

The bracket 10 has a number of openings 36 for fastening elements, such as screws or bolts. Some of the openings 36 may be designed with a depression 38 to facilitate the easy insertion and operation of fastening means and a recess to contain the upper part of the fastening elements, e.g. the head of a screw or bolt, inside the basic element 10.

Figure 2:
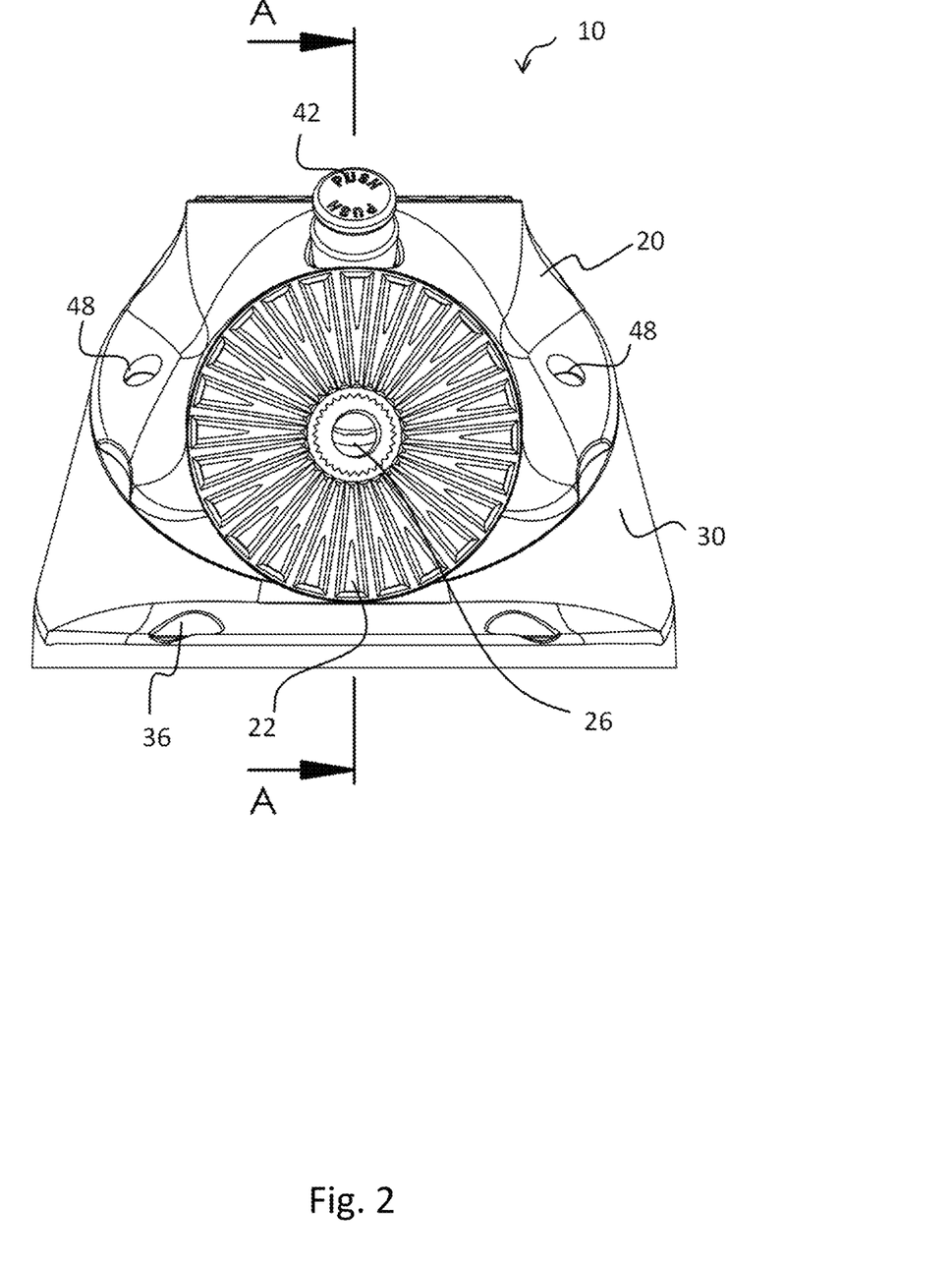
FIG. 2 shows a front view of the multifunctional mounting bracket.

FIG. 2 is a front view of one embodiment of the multifunctional mounting bracket 10 showing the top element 20 equipped with a circular connection surface 22. The connection surface comprises an inner threaded connection means suitable for mounting of standard ready-made furniture legs with a threaded rod or a screw-type fitting inserted at the top of the furniture leg and projecting outwardly from it. Obviously, the inner thread of connection means 26 is designed to fit to the screw-type rod on the leg to be mounted. Standard, commercially available furniture legs are often designed to fit a M8 or a M10 thread.

FIG. 2 also shows the bottom element 30 and the openings for fastening means 36. Furthermore the figure shows the push button 42 and the interlocking connector openings 48 which are involved in one embodiment of the locking mechanism.

Figure 3:
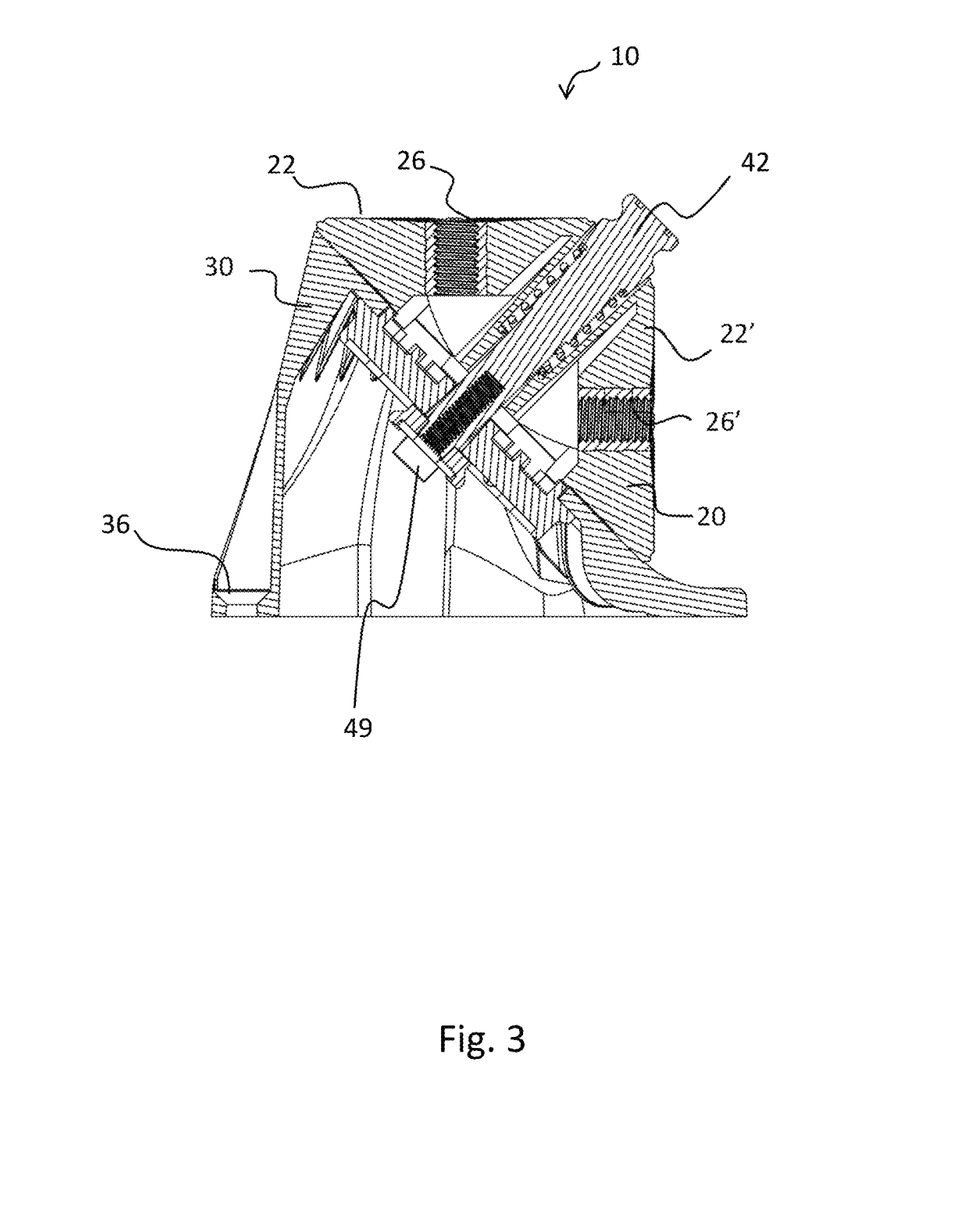
FIG. 3 shows a sectional view of the multifunctional mounting bracket taken along the lines A-A of FIG. 2.

FIG. 3 is a sectional view of the multifunctional mounting bracket 10 taken along the lines A-A of FIG. 2 showing the connection surfaces 22, 22' and the inner threads 26, 26' of the connection means of the top element 20. Also shown is the bottom element 30 with an opening for a fastening element 36, suitable for fastening the bracket to the surface of furniture, and the means 49 used to assemble the locking mechanism.

Figure 4:
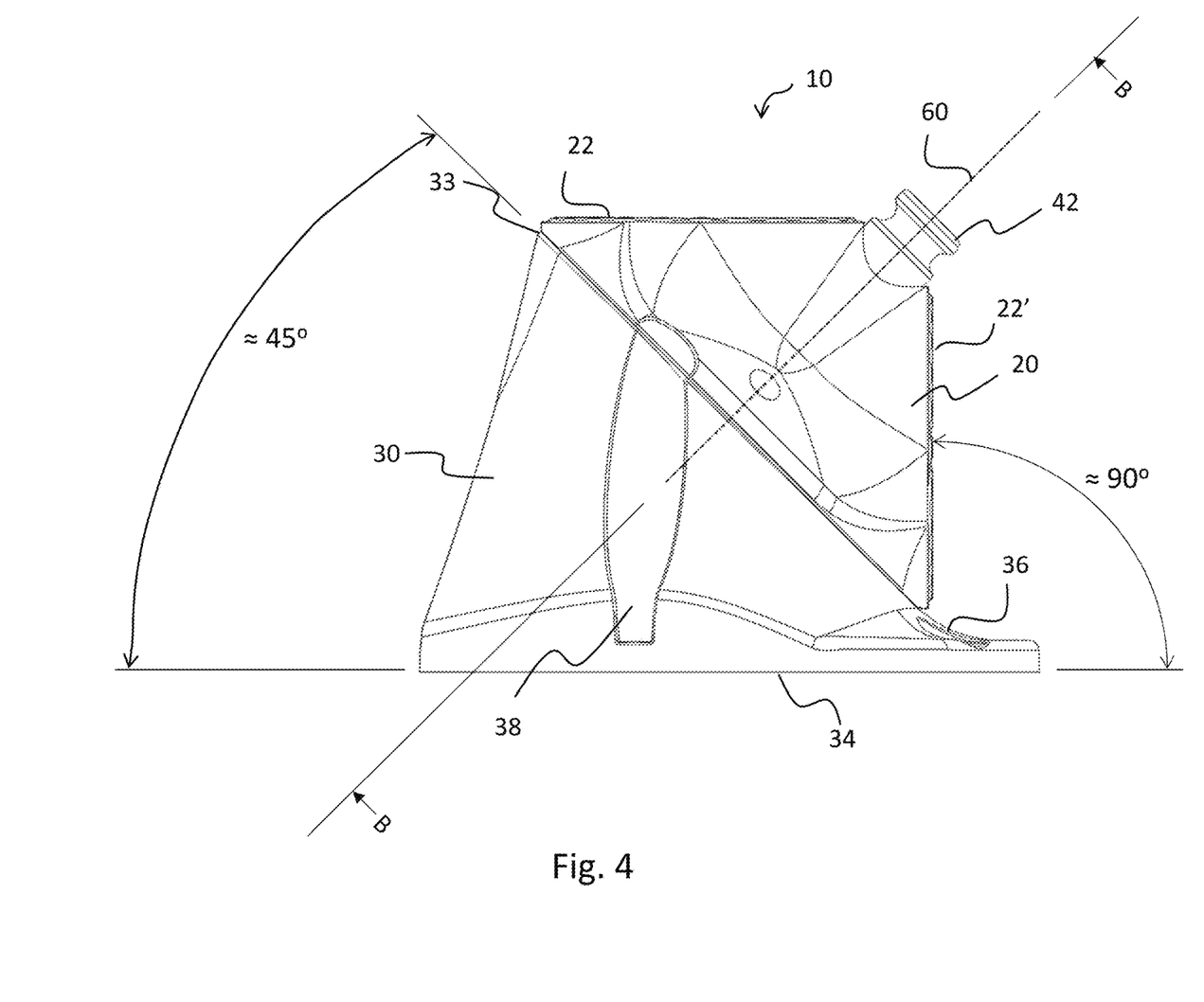
FIG. 4 shows a side view of the multifunctional mounting bracket.

FIG. 4 shows the multifunctional mounting bracket 10 seen from a side. The top 20 and the bottom 30 elements are rotationally connected to each other. The axis of rotation is indicated with 60.

In this embodiment, the plane defined by the interface between the top element 20 and the bottom element 30 is indicated with 33. This plane is parallel to the third plane of the top element and the fifth plane of the bottom element. The figure shows a situation where this plane is tilted approximately 45° relative to the mounting surface 34 of the bracket. This embodiment is furthermore characterized by one of the connection surfaces 22 being at an angle of approximately 90° with the mounting surface of the bracket, while the other connection surface is approximately parallel with the mounting surface.

Also shown are an opening for fastening means 36 and a depression 38 which facilitates the access to fastening means.

Figure 5:
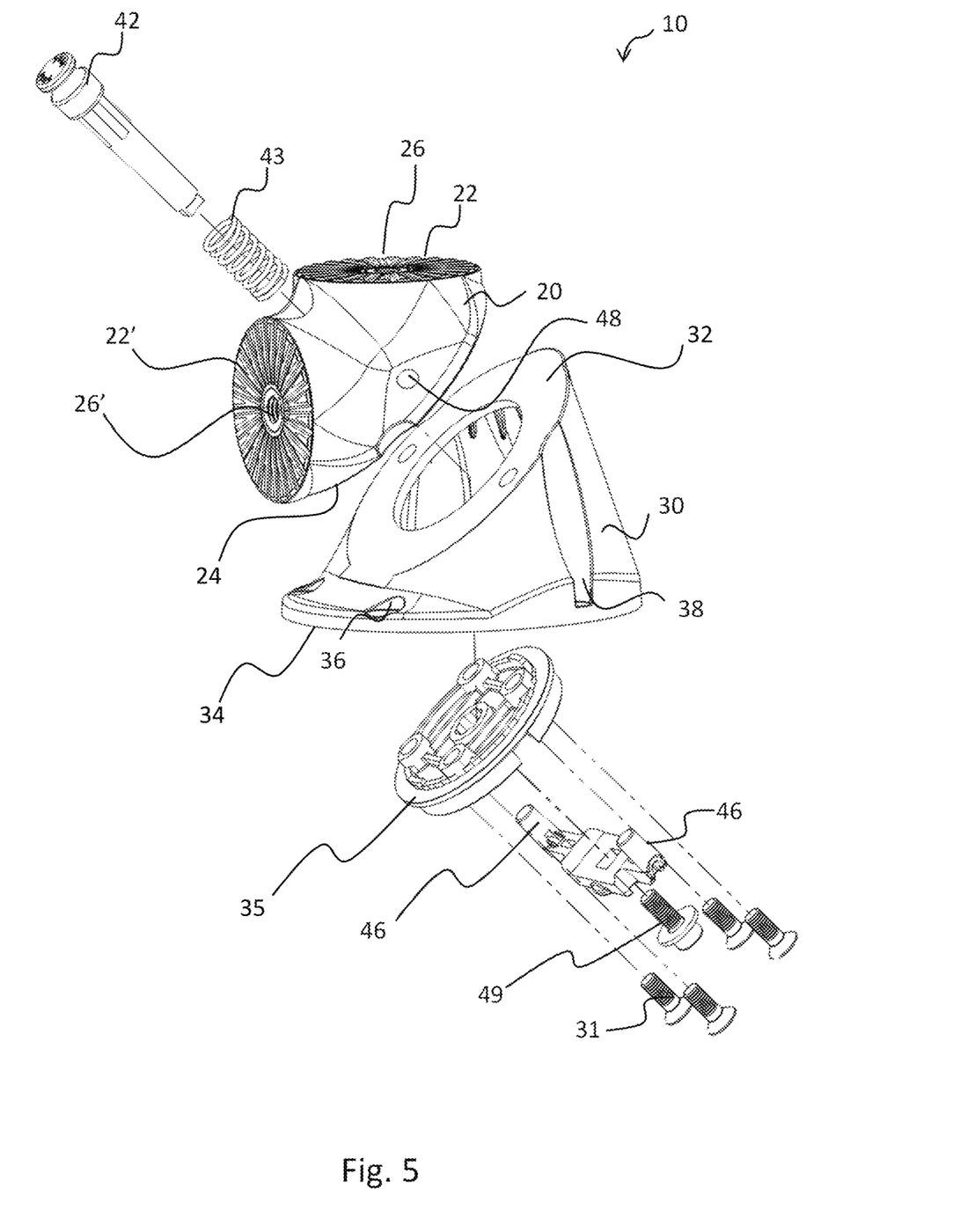
FIG. 5 shows an exploded view of the multifunctional mounting bracket.

FIG. 5 is an exploded view of one embodiment of the multifunctional mounting bracket 10. The top 20 and the bottom 30 element are rotationally assembled with the top element interface surface 24 towards the bottom element interface surface 32. The assembly is accomplished e.g. by the use of an assembly element 35 and suitable fastening means 31. The activating push bottom 42 may be spring-loaded by the spring 43 to ensure that the top element 20 is locked into one of the two positions relatively to the bottom element 30, unless the button is activated. The push bottom 42 is connected to the locking mechanism by a fastening means 49. Thus the two interlocking connectors 46 may be disengaged from the interlocking connector openings 48 by pushing the activating push bottom. Thereby the top element 20 may be rotated relatively to the bottom 30 element.

Figure 6A:
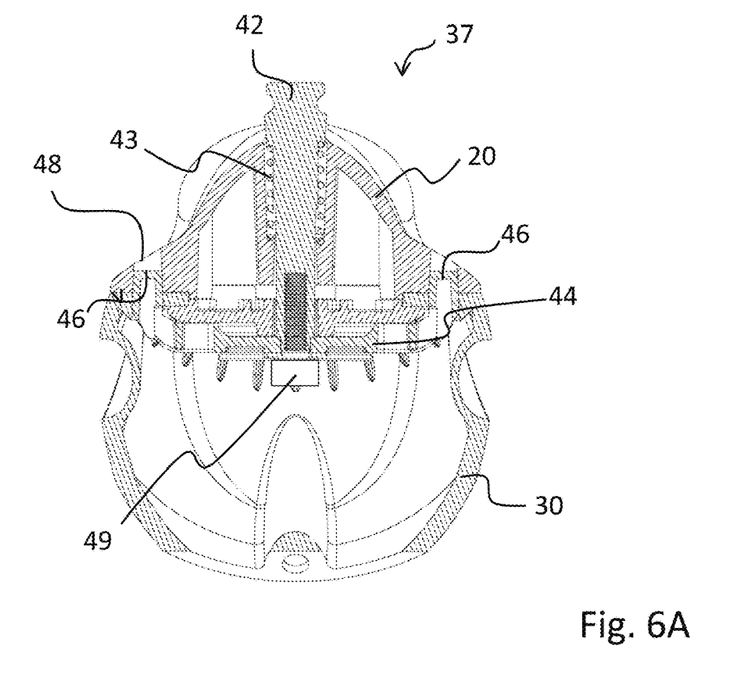
FIGS. 6A and 6B are two sectional views of the multifunctional mounting bracket taken along the lines B-B of FIG. 4 in a locked and unlocked position.
Figure 6B:
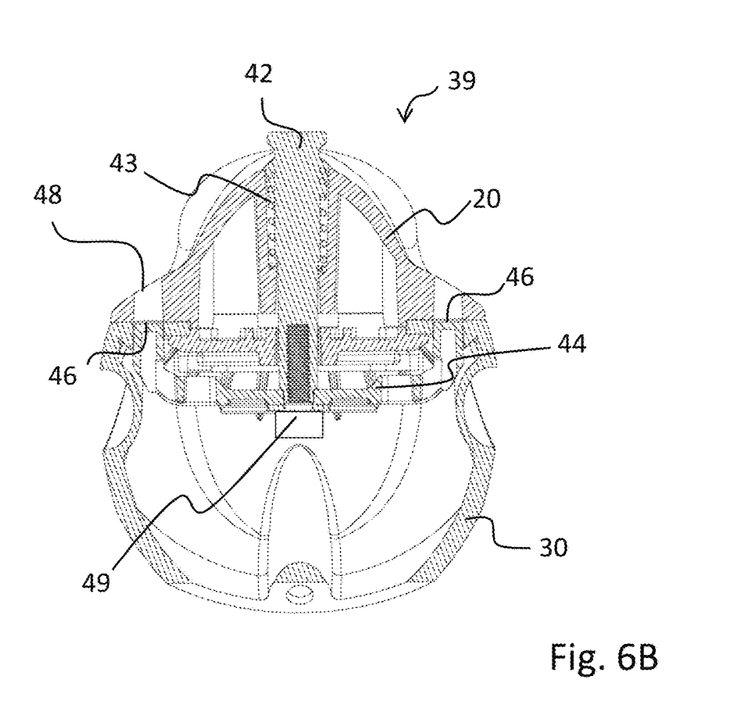

One design of the locking mechanism is further illustrated in FIG. 6A and FIG. 6B. Both figures are sectional views of the multifunctional mounting bracket taken along the lines B-B of FIG. 4 and show a locked and an unlocked position.

FIG. 6A illustrates the mounting bracket in a locked position 37. FIG. 6B illustrates the mounting bracket in an unlocked position 39. Note the position of the interlocking connectors 46, which may or may not be engaged into the Interlocking connector openings 48.

The locking mechanism comprises e.g. a locking plate 44, with interlocking connectors 46, and is attached to the activating push button 42 by a fastening means 49. The activating push button 42 may be spring-loaded to ensure that the top element 20 is locked into one of the two positions—rotated 0° or 180°—unless the button is activated. However, the activating push button may also be designed with a "click function" or a similar functionality to ensure that the bracket is locked in either of two positions unless deliberately unlocked.

Figure 7:
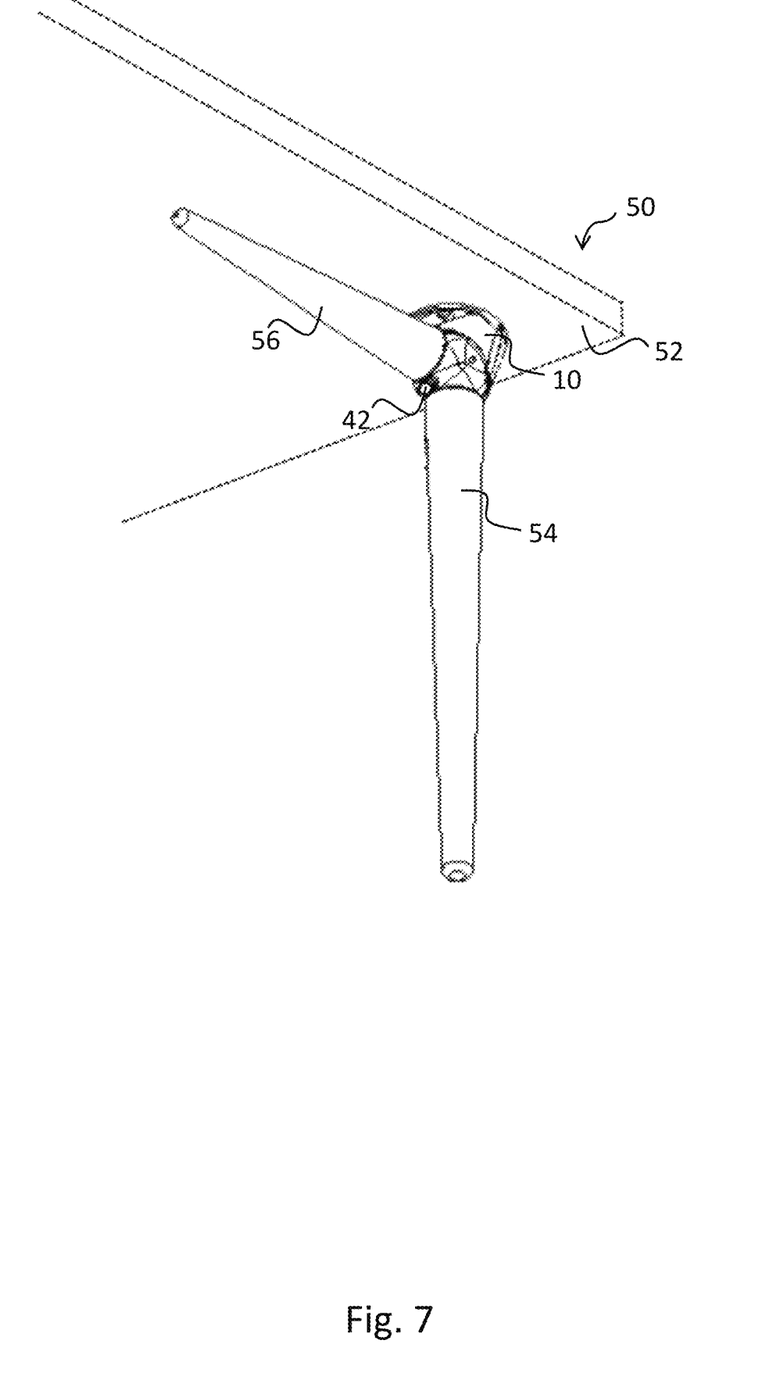
FIG. 7 shows a perspective view of the multifunctional mounting bracket mounted to an underside of a table top and arranged with two legs of different length.

FIG. 7 shows one embodiment of the invention comprising the multifunctional mounting bracket 10 fitted with two furniture legs, 54 and 56, of different lengths. The bracket is mounted by the use of a number of fastenings means, e.g. suitable screws or bolts, on the mounting surface 52 of a piece of furniture 50. Typically 3-5 brackets are mounted on the mounting face, and typically the lengths of the legs are of two similar lengths.

The furniture legs are indicated to be round and somewhat tapered for illustrative purposes only. In other embodiments the legs may be of any form and length. The particular design of the bracket may be adapted to the form of the legs to provide a robust and aesthetically pleasant solution.

Figure 8A:
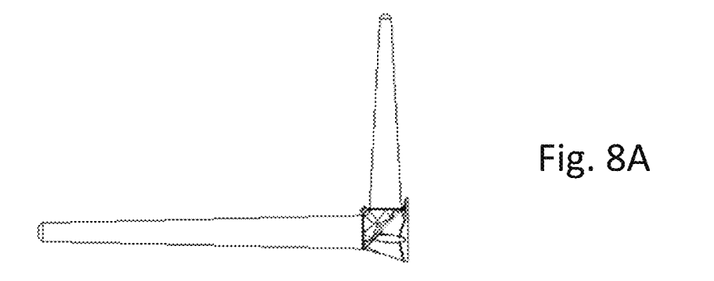
FIGS. 8A-8D show perspective views of the multifunctional mounting bracket arranged with two legs and illustrating the transition between two rotational end positions of the bracket.
Figure 8B:
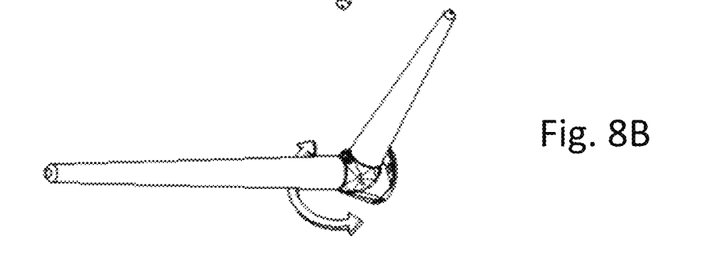
Figure 8C:
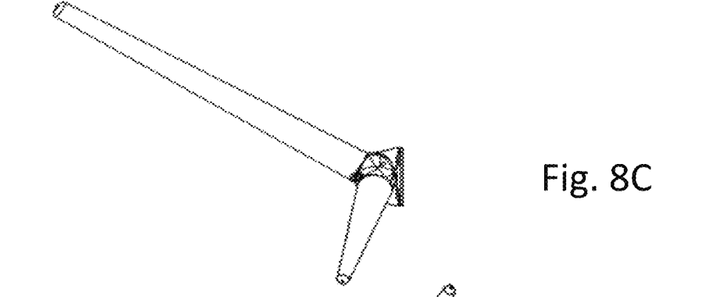
Figure 8D:
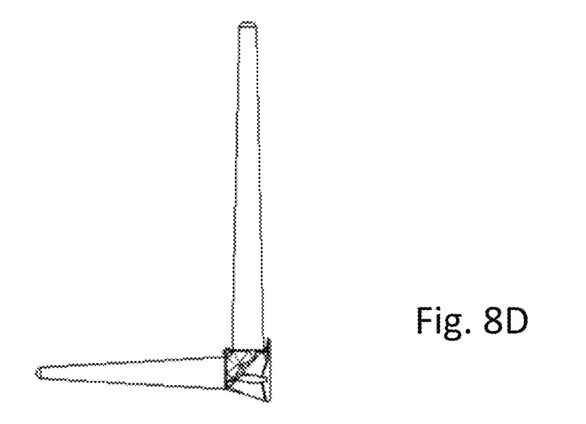

FIG. 8A-D show the switch between long and short legs which comes about by the rotation. FIG. 8A is a side view of the position where the long leg supports the furniture. FIG. 8B is an Isometric view of the same position. The doubled-headed arrow indicates a rotation around a rotation axis which in this embodiment is tilted 45° relative to both legs and the mounting surface of the furniture. FIG. 8C is a side view showing an intermediate position during the rotation, and FIG. 8D is a side view showing the position after a full 180° rotation. In this position, the short leg is in a position to support the furniture.

Figure 9:
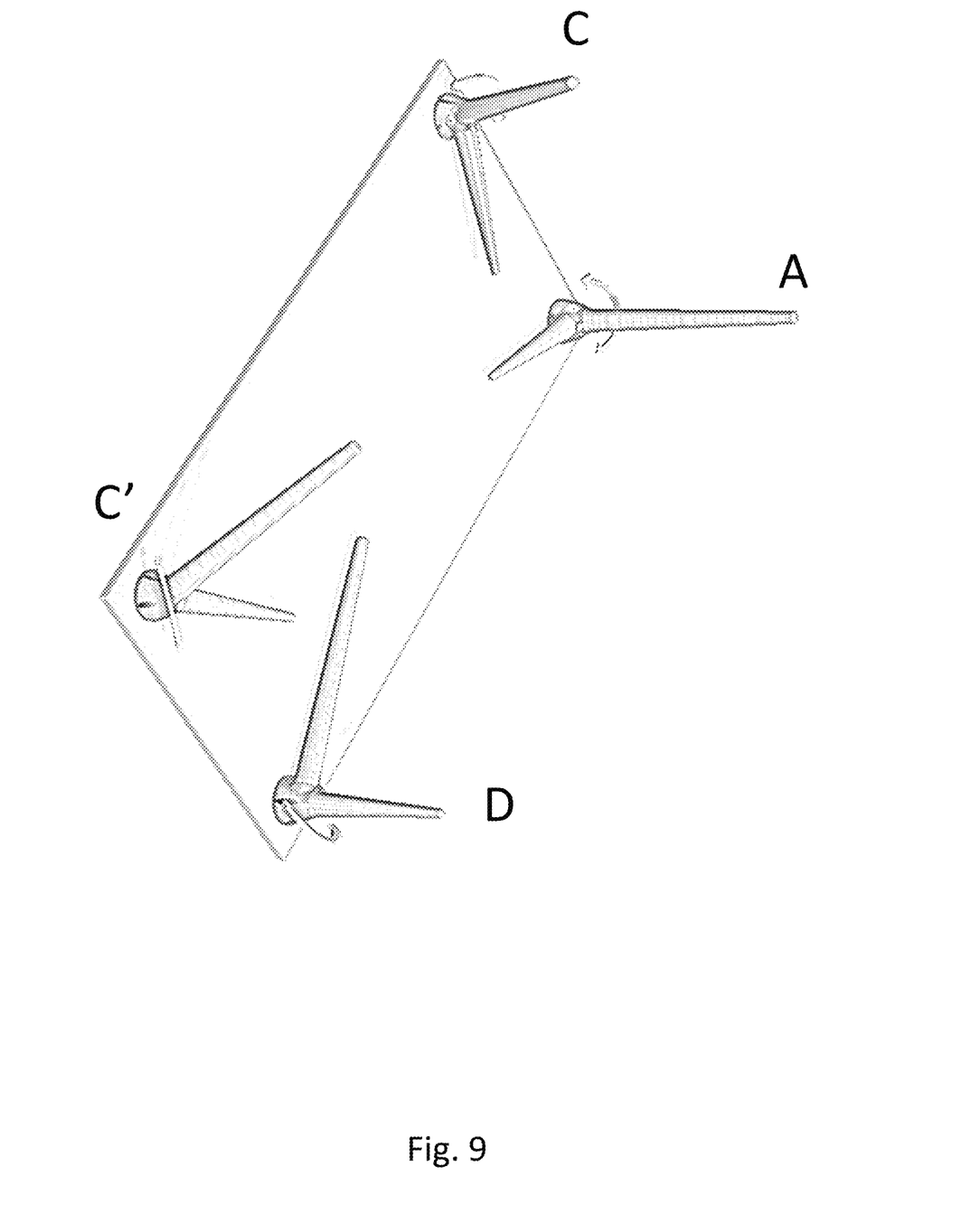
FIG. 9 shows a perspective view of the switch between long and short legs mounted on a table, by twisting the mounting bracket. Position A: position where one long leg supports the furniture. Position C and C' shows two positions during the rotation. Position D: shows the position after a full 180° rotation, where one short leg is in a position to support the furniture.

The switching between e.g. a low and a high position of a piece of furniture is furthermore illustrated in FIG. 9. In this figure, situation A illustrates a position where the long leg supports the furniture. Situation C and C' show two intermediate positions during the rotation, and situation D shows the position after a full 180° rotation, bringing the short leg into position to support the furniture. It is apparent that in the case where a piece of furniture is mounted with e.g. four brackets, all four brackets will typically be mounted with and locked in a position ensuring that the furniture is supported by legs of a similar length.

Figure 10:
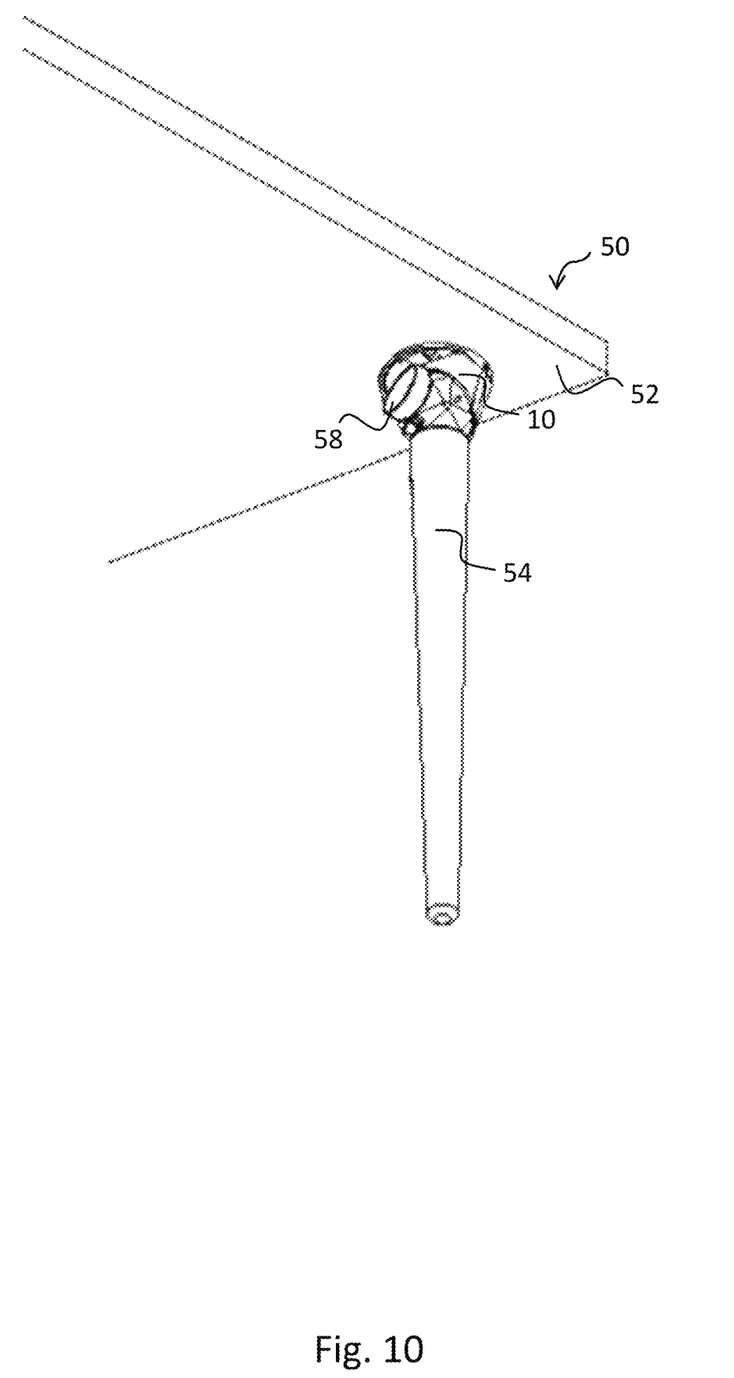
FIG. 10 shows a perspective view of the multifunctional mounting bracket mounted to an underside of a table top and arranged with one leg and one bumper.

Instead of being equipped with two legs, the bracket 10 may be equipped with one leg 54 and one other element e.g. a bumper or a similar element 58. This situation is illustrated in FIG. 10.

The bumper element may have a number of designs and can be made of many materials. One preferred embodiment is shown in FIG. 10. In this situation, the outer surface of the bumper 58 is made of an elastic material with a relatively high friction, e.g. rubber. The bumper may be provided with a central part (e.g. a threaded rod or a screw projecting outwardly from the bumper) which fits into the connection means 26 of the bracket (e.g. an inner thread) and ensures that the bumper stay attached to the connection surface during use.

Figure 11A:
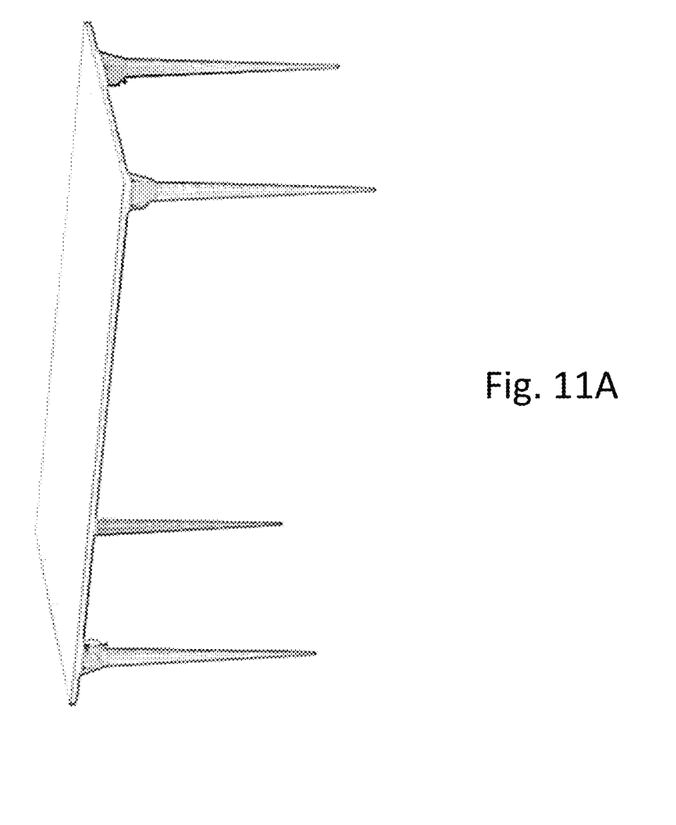
Figure 11B:
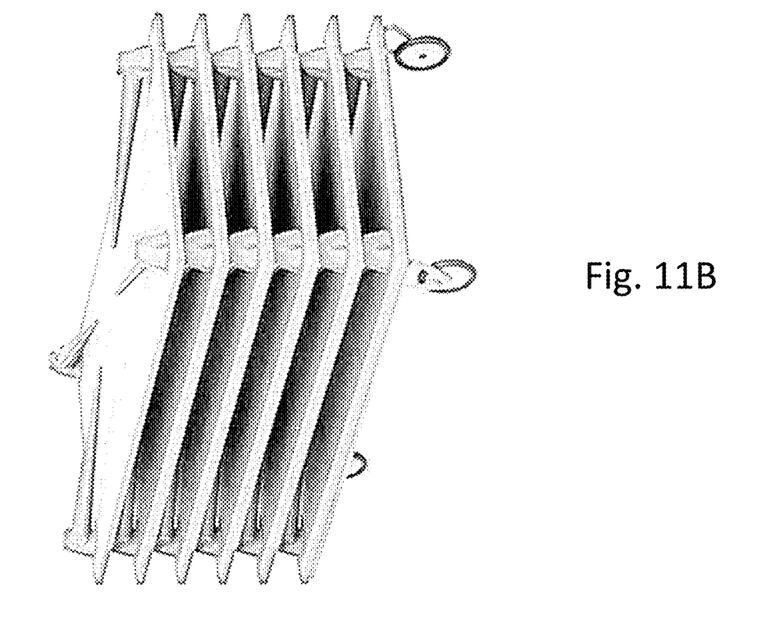
FIG. 11B shows a number of tables in the stack-up position and placed on a suitable vehicle.

By substituting one leg with a suitable bumper element, the mounting bracket provides a convenient stacking functionality in one of the two alternative positions. FIG. 11A illustrates a table equipped with brackets mounted with one leg and one bumper in the "table" position. FIG. 11B illustrates a stack of tables with brackets in "stack-up" position and placed on a suitable cart.

Figure 12A:
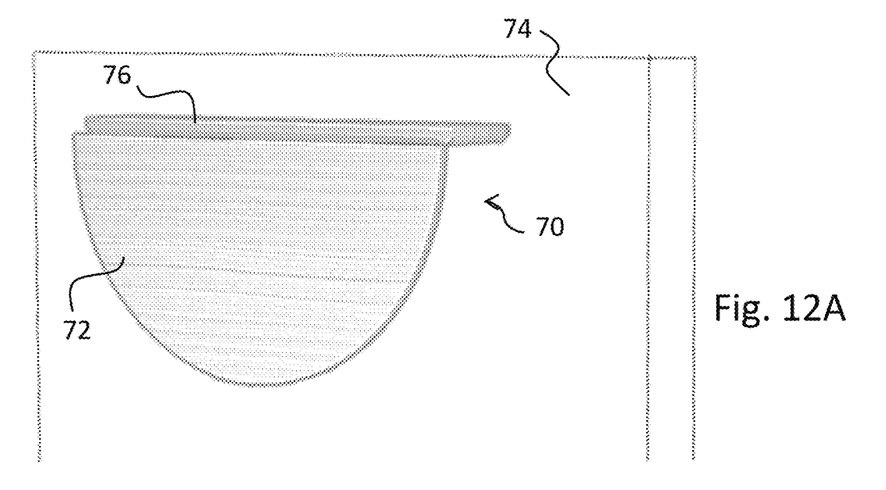
FIGS. 12A-12C illustrate an embodiment where the multifunctional mounting bracket is used to support a folding table.
Figure 12B:
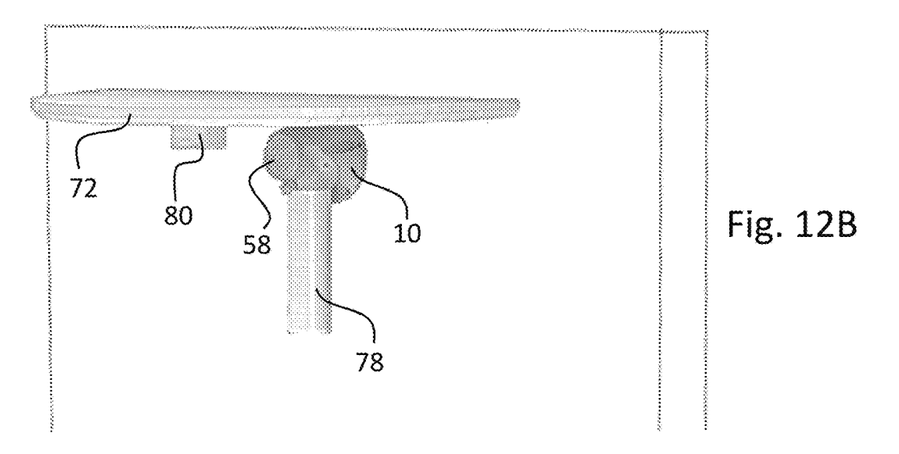

FIGS. 12A-12B illustrate the use of the multifunctional mounting bracket to support a fold up wall mounted tabletop 72.

The combination of the tabletop 72 hinged to a wall via a wall-mounted tabletop element 76 and the bracket 10 mounted with a support element 78 and a bumper 58, forms a folding table 70.

FIG. 12A illustrates the folding table 70 in a collapsed position.

FIG. 12B illustrates the folding table 70 in an up-folded position giving access to the bracket 10.

Figure 12C:
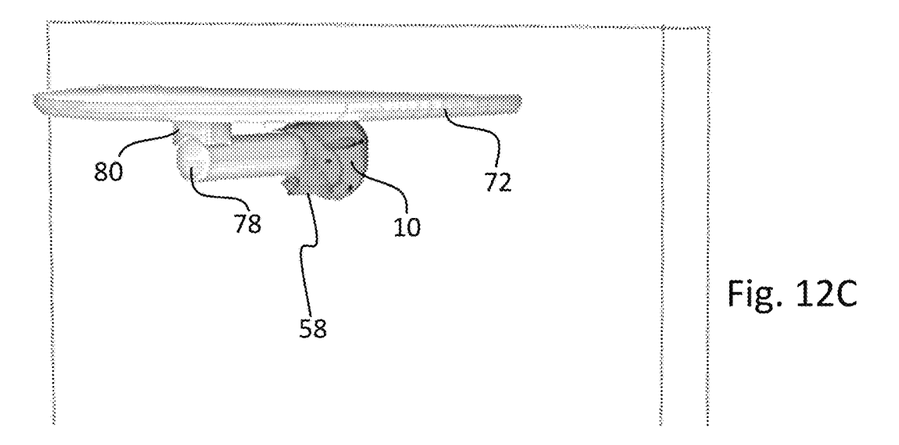

As shown in FIG. 12C, by tuning the bracket 180°, the bumper 58 and the support element 74 shift position and provide support for the folding table in an up-folded position. Similarly, by turning the bracket 180°, the folding table may be collapsed.

It is apparent that the same folding table functionality may be obtained by mounting the bracket 10 on the tabletop 72 instead on the wall. The necessary adjustments such as e.g. the position of the support block 80 are known to both amateur and professional craftspeople.

REFERENCE NUMBERS

In the following is given a list of reference numerals that are used in the detailed description of the invention and the drawings referred to in the detailed description of the invention.

10 Mounting bracket
20 Top element
22, 22' Top element connection surface
24 Top element interface surface
26, 26' Connecting means
29, 29' Rib
30 Bottom element
31 fastening means
32 Bottom element interface surface 33 Interface between top element and bottom element
35 Assembly element
34 Mounting surface
36 Openings
37 Mounting bracket in locked position
38 Depression for fastening means
39 Mounting bracket in unlocked position
40 Locking mechanism
42 Push button
43 Spring
44 Locking plate
46 Interlocking connector
48 Interlocking connector opening
49 fastening means for locking mechanism
50 Furniture
52 Mounting surface of furniture
54 Long furniture leg
56 Short furniture leg
58 Bumper
60 Rotational axis of top element
70 Folding table
72 Tabletop
74 Wall
76 Wall-mounted tabletop element
78 Support element
80 Support block

The invention claimed is:

1. A multifunctional mounting bracket for connecting at least one furniture leg to a mounting surface of a furniture, such as a tabletop,
said multifunctional mounting bracket comprising a top element and a bottom element rotationally connected to each other,
said top element comprising two connection surfaces defining first and second planes, respectively, and each having connection means configured for connecting the at least one furniture leg at each of said two connection surfaces, said top element further comprising a top element interface surface defining a third plane, said first and second planes of said two connection surfaces, respectively, being arranged at a first angle being different from zero in relation to each other, and at second and third angles different from zero in relation to said third plane of said top element interface surface,
said bottom element comprising a mounting surface defining a fourth plane and arranged for connection to said mounting surface on the furniture, said bottom element further comprising a bottom element interface surface rotationally connected to said top element interface surface and defining a fifth plane being arranged parallel to said third plane and arranged at a fourth angle different from zero in relation to said mounting surface, and
wherein said second and said third angles, respectively, are numerically between approximately 40-90 degrees.

2. The multifunctional mounting bracket according to claim 1, wherein said first angle is approximately numerically twice as large as said fourth angle.

3. The multifunctional mounting bracket according to claim 1, wherein a sum of said second and said fourth angle, or said third angle and said fourth angle, is numerically approximately 90 degrees.

4. The multifunctional mounting bracket according to claim 1, wherein said multifunctional mounting bracket comprises a locking mechanism arranged within a cavity of said multifunctional mounting bracket for locking said multifunctional mounting bracket into one of two positions.

5. The multifunctional mounting bracket according to claim 4, wherein said locking mechanism comprises an activating push button for activating said locking mechanism.

6. The multifunctional mounting bracket according to claim 5, wherein said locking mechanism is spring-loaded in a locked position, where said at least one interlocking connector engages said top element and said bottom element, and arranged for being moved into an unlocked position by moving said activating push button, where said at least one interlocking connector is disengaged from said top element and said bottom element.

7. The multifunctional mounting bracket according to claim 4, wherein said locking mechanism comprises a locking plate having at least one interlocking connector, said at least one interlocking connector being arranged for interlocking said top element and said bottom element in relation to each other against rotational movement.

8. The multifunctional mounting bracket according to claim 1, wherein said two connection surfaces comprise a number of protrusions or elevations for creating a frictional engagement with the at least one furniture leg being connected to said two connection surfaces.

9. The multifunctional mounting bracket according to claim 8, wherein said number of protrusions or elevations comprise ribs.

10. The multifunctional mounting bracket according to claim 1, wherein said top element interface surface and said bottom element interface surface are substantially circular or quadratic.

11. The multifunctional mounting bracket according to claim 1, wherein said connection means comprises a projecting threaded rod suitable for connection to an internal thread element of the at least one furniture leg, or an internal thread element suitable for engaging a projecting bolt of the at least one furniture leg, said projecting threaded rod or said internal thread element being spring-loaded by a spring element acting a tensional force against rotation of said projecting bolt or said internal thread element.

12. The multifunctional mounting bracket according to claim 1, wherein said connection means comprises a spring-loaded internal thread element.

13. The multifunctional mounting bracket according to claim 1, wherein the multifunctional mounting bracket mainly is made of material that is suitable for casting or molding.

14. The multifunctional mounting bracket according to claim 13, wherein the material comprises polymers or metals.

15. The multifunctional mounting bracket according to claim 1, wherein a major part of the multifunctional mounting bracket is made of Polycarbonate (PC) or Acrylonitrile butadiene styrene (ABS) plastics.

16. The multifunctional mounting bracket according to claim 1, wherein said second and said third angles, respectively, are numerically between approximately 45-70 degrees.

17. The multifunctional mounting bracket according to claim 1, wherein said second and said third angles, respectively, are numerically approximately 45 degrees.

* * * * *